US 6,544,451 B1

(12) United States Patent
Heitner et al.

(10) Patent No.: US 6,544,451 B1
(45) Date of Patent: Apr. 8, 2003

(54) DIRECT SHEET EXTRUSION OF SOLID SURFACE SHEET AND PROFILED MATERIALS

(75) Inventors: Barry J. Heitner, East Amherst, NY (US); Clyde Spencer Hutchins, Boston, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 416 days.

(21) Appl. No.: 09/602,710

(22) Filed: Jun. 26, 2000

(51) Int. Cl.⁷ .............................................. B29C 47/60
(52) U.S. Cl. ................. 264/102; 264/211; 264/211.23; 264/331.18
(58) Field of Search ................................ 264/102, 211, 264/211.21, 211.23, 331.18; 425/131.1; 366/75, 76.1

(56) References Cited

U.S. PATENT DOCUMENTS

| | | | | |
|---|---|---|---|---|
| 4,104,289 A | * | 8/1978 | Jones | 523/211 |
| 4,183,991 A | | 1/1980 | Smiley et al. | |
| 5,543,173 A | * | 8/1996 | Horn et al. | 427/212 |
| 5,643,645 A | | 7/1997 | Banyay et al. | |
| 5,856,389 A | * | 1/1999 | Kostrzewski et al. | 524/400 |
| 5,911,929 A | * | 6/1999 | Rosen | 264/102 |
| 6,129,873 A | * | 10/2000 | Shelby et al. | 264/102 |
| 6,165,399 A | * | 12/2000 | Guntherberg et al. | 264/102 |
| 6,203,911 B1 | * | 3/2001 | Weberg et al. | 428/413 |
| 6,207,741 B1 | * | 3/2001 | Beauchemin | 524/412 |

* cited by examiner

Primary Examiner—Mark Eashoo

(57) ABSTRACT

A process is disclosed for direct extrusion of an acrylic polymer highly filled with aluminum trihydroxide wherein a lubricant is introduced to permit the composition to be extruded at a temperature below about 200° C.

6 Claims, No Drawings

DIRECT SHEET EXTRUSION OF SOLID SURFACE SHEET AND PROFILED MATERIALS

BACKGROUND OF THE INVENTION

1. Field of the Invention

This invention relates to a process for producing highly filled acrylic solid surface sheet material by a direct extrusion process in which the extrudate rheology is controlled to prevent degradation of ingredients.

2. Description of the Related Art

A typical process for producing filled acrylic solid surface sheet material comprises compounding the ingredients in a twin-screw extruder, extruding strands of the mixture and cutting the strands into pellets. The pellets are then extruded using a single screw extruder where sheet is formed by passing the mixture through a die. Optionally, the mixture may be passed through a gear pump and then into a sheet die. After passing through the die, the sheet is passed through calendar rolls to provide a desired finish.

The process requires two extruders and in the process the ingredients are exposed to two heating cycles, which can result in degradation of some of the ingredients. Also, the use of two extruders and the additional processing time adds to the expense of making the sheet material.

Another prior art process comprises melting a resin such as PMMA, adding a plasticizer e.g. a phthalic ester or an aliphatic dibasic ester such as dimethyl phthalate, dioctyl phtalate, dibutyl phthalate, dibutyl sebacate or dioctyl sebacate to lower the viscosity of the resin and then adding a filler such as ATH, aluminum trihyroxide, to a twin screw extuder. The melt then exits the extruder and goes through a die to form a sheet. The plasticizer that is added remains in the sheet and can migrate to the surface. If the sheet is used in applications involving contact with food, the plasticizer based on phthalate chemistry is undesirable due to potential carcenogenic behavior and potential hormone disruptive properties. The plasticizer is needed to lower the melt viscosity so that the melt temperature can be reduced to below the decomposition temperature of the filler, e.g. ATH, which is in the range of 190 to 200° C.

There is a need for a direct extrusion process which eliminates the justmentioned disadvantages.

SUMMARY OF THE INVENTION

The above-mentioned problems are avoided by a process for producing a highly filled acrylic solid surface sheet material comprising introducing ingredients including an acrylic resin, from 30–62% by weight based on total weight of all ingredients of aluminum trihydroxide as a filler, and a lubricant in an amount from 1–5% by weight of the acrylic resin, into interconnected zones of an apparatus for mixing the ingredients, introducing the acrylic resin into a first zone, introducing the lubricant into the first or a second zone, introducing the filler into a third zone, mixing the ingredients and removing gasses which may develop while advancing the resulting mixture toward an outlet, and forming the mixture into a solid surface sheet or a profiled article, i.e. shaped article, by passing the mixture through a die. The sheets and articles are useful for spa, sanitary ware, countertops, and bathroom and kitchen fixtures.

DETAILED DESCRIPTION OF THE PREFERRED EMBODIMENTS

Particularly desirable products which include an acrylic resin such as poly(methylmethacrylate) (PMMA) highly filled with aluminum trihydroxide (ATH), e.g. 30 to 62% by weight, can be made by a direct extrusion process by controlling the extrudate rheology. The process for extruding a composition containing ATH is limited due to decomposition of the ATH at temperatures above about 200° C. In the normal extrusion of PMMA temperatures reach 230° C. and upward. At temperatures less than 200° C. the PMMA melt has a very high viscosity limiting mixing and extrusion of the ingredients. This problem is overcome in the present process by introducing a lubricant into the PMMA thereby lowering the viscosity of the melt prior to introduction of ATH and permitting the temperature to be maintained below 200° C.

The process comprises introducing ingredients including an acrylic resin, from 30–62% by weight based on the total weight of all ingredients of ATH as a filler, and a polymerizable monomer/initiator solution in an amount from 114 5% by weight of the acrylic resin, into an extruder with or without a downstream gear pump, two extuders in series, or a Buss co-Kneader with a downstream gear pump interconnected in which acrylic resin is added at the feed throat, the monomer/initiator solution preferably being added downstream through an injection port in a barrel, and then ATH being added further downstream into a barrel using a stuffer apparatus, and removing gases into a vacuum vent port. The resulting polymer melt may then be fed through a gear pump and the mixture formed into a solid surface sheet by passing the polymer melt mixture through a die.

The preferred range of filler is from 40 to 60% by weight based on total weight of the ingredients. The preferred lubricant is a polymerizable monomer such as 2-ethylhexylacrylate (ETH), sold by ELF Atochem, Inc. which forms a polymer which is incompatible with the acrylic resin. An amount from about 1 to 5% by weight of the ingredients can be used. An initiator to polymerize the acrylate monomer is added. The monomer polymerizes at about the same temperature of the PMMA melt, i.e. about 190–200° C. A preferred initiator is a peroxy initiator such as Lupersol® 101, 2,5-dimethyl-2-5-di(t-butylperoxy) hexane sold by Elf Atochem, Inc. Other acrylate monomers which serve as lubricants may be used. They include but are not limited to methyl acrylate, ethyl acrylate, i-propyl acrylate, n-propyl acrylate, n-butyl acrylate, i-butyl acrylate, and lauryl acrylate. Fatty acid esters such as stearyl acrylate may be used.

In addition to the ingredients noted above, additives such as pigments, dyes, rubbers, flame retardants, antioxidants and the like as know to those skilled in the art may be added.

In the process the melt temperature of the mixture is kept below about 200° C. to minimize decomposition of ATH. In the normal extrusion of PMMA, temperatures reach 230° C. and upward. At less than about 200° C. PMMA melt has a very high viscosity so the torque exceeds the capability of the extrusion machines. In the present process this problem is overcome by introducing the lubricant into the PMMA thereby lowering the viscosity of the melt prior to the introduction of ATH and permitting the temperature to be maintained below about 200° C.

The following examples in which parts and percentages are by weight unless otherwise indicated further illustrate the invention.

EXAMPLES

Example 1

Experiments were conducted using a 50 mm Lestritz twin screw extruder (L/D=40) with a downstream gear pump and sheet die. VM-100 PMMA pellets were fed by a loss in weight feeder to the feed throat. A solution of 99% 2-ethyl hexyl acrylate and 1% Lupersol® 101 (2,5-dimethly-2,5-di(t-butylperoxy) hexane were pumped to the extruder through an injection valve at Barrel 3. WH 311 ATH (produced by Alcan, average particle size 35 microns) was added using a stuffer at Barrel 5. Barrel 8 was under vacuum to remove any unreacted monomer and any degradation products. The ingredients were added at the following ratios: 47% acrylic polymer, 3% acrylate solution, and 50% ATH.

Throughput—200 pph
Extruder Speed—200 rpm
Extruder Torque—27%
Barrel 1 Water cooled—Feed Throat
Barrel 2 Zone 1 Temperature—222° C.
Barrel 3 Zone 2 Temperature—222° C.—Acrylate injection
Barrel 4 Zone 3 Temperature—200° C.
Barrel 5 Zone 4 Temperature—185° C.—ATH addition
Barrel 6 Zone 5 Temperature—185° C.
Barrel 7 Zone 6 Temperature—188° C.
Barrel 8 Zone 7 Temperature—178° C.—Vacuum port500 mbar
Barrel 9 Zone 8 Temperature—170° C.
Barrel 10 Zone 9 Temperature—170° C.
Adapter—185C.
Gear Pump—177° C.
Gear pump speed—1000 rpm
Adapter—177° C.
Die—180° C.–199° C.
Melt Temperature after extruder—195° C.
Melt Temperature after die—200° C.

The sheet coming out of the die went through a set of calendering rolls. The sheet was smooth with no signs of foam indicating no decomposition of the ATH.

Example 2

Experiments were conducted using a 70 mm MKS/APC Buss Co-Kneader, (manufactured by Buss America in the USA), (L/D=18) with a downstream gear pump and squeezed pipe simulating a thick sheet die. PMMA pellets (6N from Rohm) were fed by a loss in weight feeder to the feed throat. A solution of 99% 2-ethyl hexyl acrylate and 1% Lupersol® 101 (2,5-dimethyl-2,5-di(t-butylperoxy) hexane were pumped to the Buss Co-Kneader through an injection valve at Barrel 1 downstream of the feed throat. WH 311 ATH was added using a stuffer at Barrel 2 with an atmospheric vent right before the stuffing port. An atmospheric vent was open in Barrel 3 and a vent was connected to vacuum in Barrel 4. The melt was then pumped to a 40/40 gear pump and then through the "quasi die". Polymer melt coming out of the die was about ½" thick and 6" wide. The ingredients were added at the following ratios: 38% acrylic polymer, 2% acrylate solution, and 60% ATH.

Throughput—330 pph
Co-kneader Speed—150 rpm
Co-kneader Power—13 kW
Screw Temperature—180° C./140° C.
Barrel 1 Temperature—180° C.
Barrel 2 Temperature—160° C.
Barrel 3 Temperature—140° C.
Barrel 4 Temperature—140° C.
Gear Pump—170° C.
Gear pump speed—50 rpm
Die—not heated
Process Temperature 1—158° C.
Process Temperature 2—166° C.
Process Temperature 3—125° C.
Process Temperature 4—130° C.
Process Temperature 5—137° C.
Process Temperature 6—183° C.
Process Temperature 7—189° C.
Melt Temperature after die—217° C.

The sheet coming out of the die had no visible bubbles. Due to its thickness, bubbles could have been hidden in the interior of the sheet. To disprove this possibility, the sheet was placed in an oven at 180° C. for 30 minutes. No bubbles were seen in this sheet indicating that there was no decomposition of the ATH.

COMPARATIVE EXAMPLE

A blend of different grades of PMMA (50°/a VO-45-100 (medium flow general purpose resin; Melt flow, ASTM D-1238 (Condition 1)=0.23 g/10 min: Impact Strength ASTM D-256 Izod=0.23 ftlbs/in of notch), 35.7% HFI-7-101 (high flow good impact resin; Melt flow=10; impact strength 0.6 ft-lbs/in of notch), and 14.3% VS-100 (high flow general purpose resin; Melt flow=24, impact strength= 0.23) and WH31 I ATH were fed to a 70 mm Buss Co-Kneader (L/D=11). The ingredients added to the Buss were 70% acrylic blend and 30% ATH. The ingredients were compounded at 200 pph and the Buss was operated at 200 rpm. The Buss temperature profile is shown below. After the Buss, the melt went through a crosshead single screw extruder and then to a strand die. The strands were then chopped into pellets. The melt temperature at the die was 216° C.

Buss Temperature profile (deg. C.),
Screw, 170
Zone 1, 180
Zone 2, 180
Crosshead, 180
90 deg. adapter, 190
Die, 200
Extruder screw speed, 200 rpm
Crosshead speed, 100 rpm
Avg. melt temperature at die, 216 C.

This resin was dried and then fed to a 4.5 inch single screw 32:1 L/D Davis Standard extruder. The extruder has a vent port and was operated under vacuum. Downstream of the extruder was a gear pump and a 60" wide die. The extruder temperature and the die temperature was set at approximately 205° C. The sheet coming out of the die was foamed indicating decomposition of the ATH.

What is claimed is:

1. A process for producing a highly filled acrylic solid surface sheet or profiled article comprising introducing ingredients including an acrylic resin, a filler in an amount from 30–62% by weight based on total weight of all ingredients, and a lubricant in an amount from 1–5% by weight of the acrylic resin, into interconnected mixing zones for mixing the ingredients, introducing the acrylic resin into a first zone, introducing said lubricant into said first or a second zone, introducing said filler into a third zone, mixing the ingredients and removing gasses which may develop while advancing the resulting mixture toward an outlet, and forming the mixture into a solid surface sheet or profiled article by passing the mixture through a die.

2. The process of claim 1 wherein the acrylic resin is polymethylmethacrylate.

3. The process of claim 2 wherein the filler is aluminum trihydroxide.

4. The process of claim 3 wherein the lubricant comprises a polymerizable monomer which forms a polymer that is incompatible with the acrylic resin and a polymerization initiator for the monomer.

5. The process of claim 4 wherein polymerization of the monomer is substantially completed before the mixture of ingredients leaves the last of said mixing zones.

6. The process of claim 5 wherein the monomer is 2-ethylhexylacrylate and the initiator is 2,5-dimethyl-2-5-di(t-butylperoxy)hexane.

* * * * *